US010387458B2

(12) United States Patent
Burge et al.

(10) Patent No.: US 10,387,458 B2
(45) Date of Patent: Aug. 20, 2019

(54) SYSTEM AND METHOD FOR SEARCHING FOR, COLLECTING AND GENERATING MOLD SPORE DATA FOR MOLD REPORTS USING CLIMATE CODES

(71) Applicant: EMLab P&K, LLC, North Canton, OH (US)

(72) Inventors: Harriet A. Burge, Novato, CA (US); David F. Gallup, Exeter, NH (US); Malcolm J. Moody, Cupertino, CA (US); Edward V. B. Chadez, Denver, CO (US); Daniel M. Devine, Lansdowne, PA (US)

(73) Assignee: EMLab P&K, LLC, North Canton, OH (US)

( * ) Notice: Subject to any disclaimer, the term of this patent is extended or adjusted under 35 U.S.C. 154(b) by 667 days.

(21) Appl. No.: 14/697,697

(22) Filed: Apr. 28, 2015

(65) Prior Publication Data
US 2015/0310088 A1 Oct. 29, 2015

Related U.S. Application Data

(60) Provisional application No. 61/985,137, filed on Apr. 28, 2014.

(51) Int. Cl.
*G06F 16/29* (2019.01)
*G06F 16/9038* (2019.01)

(52) U.S. Cl.
CPC .......... *G06F 16/29* (2019.01); *G06F 16/9038* (2019.01); *Y02A 90/15* (2018.01)

(58) Field of Classification Search
None
See application file for complete search history.

(56) References Cited

U.S. PATENT DOCUMENTS 6,031,455 A 2/2000 Grube et al.
6,662,195 B1 12/2003 Langseth et al.
(Continued)

OTHER PUBLICATIONS

Markus Kottek, Jurgen Grieser, Christoph Beck, Bruno Rudolf and Franz Rubel, "World Map of the Koppen-Geiger climate classification updated", Jun. 2006, Meteorologische Zeitschrift, vol. 15, No. 3, 259-263.*

(Continued)

*Primary Examiner* — Mark D Featherstone
*Assistant Examiner* — Ranjit P Doraiswamy
(74) *Attorney, Agent, or Firm* — Harness, Dickey & Pierce, P.L.C.

(57) ABSTRACT

A system is disclosed for obtaining historical mold spore data. The system may have a computer with a processor. At least one database may be used which contains information correlating subregion codes of a geographic area with ones of predetermined climate classification codes associated with each of the subregion codes. The database further may have available historical mold spore data for the subregion codes and be configured to receive an input indicating a target subregion code that identifies an area falling within the geographic area; to identify a specific one of the codes that is associated with the target subregion code; and to obtain portions of the stored historical mold spore data which is associated with ones of the subregion codes falling within the geographic area that have the specific one of the codes associated therewith.

17 Claims, 5 Drawing Sheets

(56) References Cited

U.S. PATENT DOCUMENTS

| | | | |
|---|---|---|---|
| 7,184,891 | B1 | 2/2007 | Kuleszynski et al. |
| 7,752,188 | B2 * | 7/2010 | Lagerstedt .............. G01W 1/02 |
| | | | 702/3 |
| 2001/0029535 | A1 | 10/2001 | Hirano et al. |
| 2003/0076369 | A1 | 4/2003 | Resner et al. |
| 2003/0208113 | A1 | 11/2003 | Mault et al. |
| 2015/0145677 | A1 * | 5/2015 | Smith, Jr. ............ G08B 21/182 |
| | | | 340/540 |
| 2016/0116640 | A1 * | 4/2016 | Phillips ................... G01W 1/10 |
| | | | 702/3 |

OTHER PUBLICATIONS

Tomas R. Cotos-Yanez et al., "Short-term prediction of Betula airborne pollen concentration in Vigo (NW Spain) using logistic additive models and partiallylinear models", International Journal of Biometeorology, Publisher: Springer Berlin/Heidelberg, ISSN 1432-1254, published online Feb. 10, 2004, 2 pages.

* cited by examiner

| Fungi Identified | Outdoor data | Typical Outdoor Data for: January in California† Köppen-Geiger climate code¹ "Csb" Mediterranean/cool summer (n‡=401) | | | | | | Typical Outdoor Data for: The entire year in California† Köppen-Geiger climate code¹ "Csb" Mediterranean/cool summer (n‡=4893) | | | | | |
|---|---|---|---|---|---|---|---|---|---|---|---|---|---|
| Project zip code 94066 | spores/m3 | very low | low | med | high | very high | freq % | very low | low | med | high | very high | freq % |
| Generally able to grow indoors\* | | | | | | | | | | | | | |
| Alternaria | 13 | 12 | 13 | 13 | 40 | 53 | 28 | 13 | 13 | 27 | 63 | 100 | 54 |
| Bipolaris/Drechslera group | - | - | - | - | - | - | 4 | 7 | 13 | 13 | 27 | 49 | 8 |
| Chaetomium | - | 13 | 13 | 13 | 25 | 32 | 11 | 11 | 13 | 13 | 27 | 50 | 20 |
| Cladosporium | 1,200 | 100 | 160 | 460 | 1,200 | 1,900 | 96 | 110 | 210 | 690 | 1,800 | 3,000 | 98 |
| Curvularia | - | - | - | - | - | - | 2 | 7 | 13 | 13 | 25 | 43 | 3 |
| Epicoccum | 13 | 7 | 13 | 13 | 33 | 53 | 15 | 8 | 13 | 13 | 40 | 53 | 21 |
| Fusarium | 13 | - | - | - | - | - | <1 | - | - | - | - | - | <1 |
| Nigrospora | - | - | - | - | - | - | 1 | 7 | 13 | 13 | 27 | 48 | 6 |
| Penicillium/Aspergillus types | 640 | 53 | 80 | 240 | 640 | 1,100 | 85 | 53 | 80 | 210 | 640 | 1,100 | 84 |
| Stachybotrys | - | - | - | - | - | - | 3 | 7 | 13 | 13 | 27 | 75 | 4 |
| Torula | - | - | - | - | - | - | 3 | 7 | 13 | 13 | 38 | 53 | 12 |
| Ulocladium | 13 | 13 | 13 | 13 | 13 | 25 | 7 | 7 | 13 | 13 | 27 | 40 | 8 |
| **Seldom found growing indoors\*\*** | | | | | | | | | | | | | |
| Ascospores | 320 | 50 | 53 | 210 | 750 | 1,400 | 81 | 33 | 53 | 160 | 480 | 960 | 81 |
| Basidiospores | 750 | 100 | 180 | 960 | 3,300 | 6,100 | 96 | 53 | 110 | 370 | 1,600 | 3,800 | 96 |
| Botrytis | 27 | 13 | 13 | 22 | 53 | 110 | 26 | 13 | 13 | 25 | 53 | 110 | 26 |
| Pyricularia | 13 | - | - | - | - | - | <1 | 13 | 13 | 13 | 32 | 53 | <1 |
| Rusts | 13 | 13 | 13 | 13 | 49 | 62 | 17 | 13 | 13 | 20 | 53 | 93 | 34 |
| Smuts, Periconia, Myxomycetes | 40 | 13 | 13 | 27 | 54 | 110 | 62 | 13 | 13 | 40 | 110 | 190 | 69 |
| § TOTAL SPORES/m3 | 3,000 | | | | | | | | | | | | |

FIGURE 4

SYSTEM AND METHOD FOR SEARCHING FOR, COLLECTING AND GENERATING MOLD SPORE DATA FOR MOLD REPORTS USING CLIMATE CODES

CROSS-REFERENCE TO RELATED APPLICATIONS

This application claims the benefit of U.S. Provisional Application No. 61/985,137 filed on Apr. 28, 2014, the entire contents of which is hereby incorporated by reference into the present disclosure.

FIELD

The present disclosure relates to systems and methods for generating mold reports, and more particularly to systems and methods that make use of climate codes or climate factors to better understand and interpret outdoor airborne fungal spore levels in a given geographic location.

BACKGROUND

The statements in this section merely provide background information related to the present disclosure and may not constitute prior art.

When performing an analysis of indoor airborne fungal spores in a home, commercial building or other structure, typically one or more indoor airborne fungal spore sample are taken along with one or more outdoor airborne fungal spore samples. The outdoor samples are typically taken in a relatively close proximity to the home or building, and typically within about 20 feet of the home or building. The goal is for the outside samples to represent the level of fungal spores found in the air entering the home or building. At least one outdoor sample is typically taken to determine if airborne fungal spores detected within the home or building are originating from a location within the home or building or are simply entering from the outdoor ambient environment. This is an important consideration because without a representation of outdoor airborne fungal spore data, one may incorrectly assume levels of one or more airborne spore types detected within the home or building are originating from some location within the home or building when they originate within the general region of the home or building (e.g., within the city or county limits). An incorrect understanding may lead the owner of the home or building to initiate expensive remediation efforts in an effort to find and remove materials that may be the source of the airborne fungal spores. But if outdoor airborne fungal spore information is available for comparison purposes, then one may conclude that elevated levels of detected spores within the home or building are originating from the ambient outdoor environment instead. In such case there may be no need to take any remediation steps within the building.

The above analysis can be significantly complicated by climate variations within a given region and other factors. For example, California has a number of distinct climates ranging from warm temperate areas to arid desert areas. As a result, outdoor spore samples collected in one region of California may vary dramatically from samples collected in other parts of the state. This can make it challenging to obtain outdoor airborne fungal spore data that reliably and accurately indicates the true airborne fungal spore counts for various types of spores in a given geographic location, say for example within the city or county that the home or building is located. This can reduce the confidence level that the outdoor spore samples obtained are truly representative of the outdoor ambient environment around the home or building.

Further complicating the analysis is that the outdoor spore samples obtained may have been obtained during or immediately after some significant weather related event in the geographic area that temporarily, but significantly, alters the spore levels detected in the outdoor samples. In such a case the outdoor samples may indicate spore levels that are misleading and are either elevated or below those that would typically be present at most times of the year in that specific geographic area. As one example, a strong rain storm within a given area may result in temporarily, but significantly, elevated levels of some types of spores. Such information would complicate the comparison between the indoor and outdoor spore samples.

In view of the above factors and considerations, it becomes of paramount importance to have a system and/or methodology that is able to intelligently obtain and make use of a wider range of outdoor spore sample data. In this manner an even more accurate and intelligent assessment of indoor spore sample data can be made.

SUMMARY

In one aspect the present disclosure relates to a system for obtaining historical mold spore data. The system may comprise a computer having a processor and at least one database. The database may contain information correlating subregion codes of a predetermined geographic area with ones of predetermined climate classification codes associated with each of the subregion codes. The database further may include available historical mold spore data for the subregion codes. The computer may be configured to receive an input indicating a target subregion code, wherein the target subregion code identifies an area falling within the predetermined geographic area. The computer may operate to identify a specific one of the predetermined climate classification codes that is associated with the target subregion code, and to obtain portions of the stored historical mold spore data which is associated with ones of the subregion codes falling within the predetermined geographic area that have the specific one of the predetermined climate classification codes associated therewith.

In another aspect the present disclosure relates to a system for generating mold spore data reports comprising a computer and at least one database in communication with the computer. The database contains information correlating subregion codes of a predetermined geographic area with ones of predetermined climate classification codes associated with each of the subregion codes. The database further may include available historical mold spore data for the subregion codes. The computer may be configured to receive an input indicating a target subregion code, wherein the target subregion code identifies an area falling within the predetermined geographic area. The computer may also operate to identify a specific one of the predetermined climate classification codes that is associated with the target subregion code. The computer may also use a stored rule set to make a determination if a sufficient number of other subregions codes, which match the target subregion code, are present within the predetermined geographic area which have at least a predetermined minimum quantity of the historical mold spore data available for use. The computer may also be configured to obtain portions of the stored historical mold spore data from the database which is associated with ones of the subregion codes falling within the predetermined geographic area that have the specific one of the predetermined climate classification codes associated therewith.

In still another aspect the present disclosure relates to a method for obtaining mold spore data for analysis. The method may comprise providing at least one database containing information correlating subregion codes of a predetermined geographic area with ones of predetermined climate classification codes associated with each of the subregion codes. The database may further include available historical mold spore data for the subregion codes. The method may involve receiving an input indicating a target subregion code, wherein the target subregion code identifies an area falling within the predetermined geographic area. An electronic component may be used to identify a specific one of the predetermined climate classification codes that is associated with the target subregion code. The electronic component may be used to obtain portions of the stored historical mold spore data from the database which is associated with ones of the subregion codes falling within the predetermined geographic area that have the specific one of the predetermined climate classification codes associated therewith.

BRIEF DESCRIPTION OF THE DRAWINGS

The drawings described herein are for illustration purposes only and are not intended to limit the scope of the present disclosure in any way.

FIG. 4 shows one example of how the historical spore data and the outdoor spore sample data may be presented in one report.

DETAILED DESCRIPTION

Figure 1:
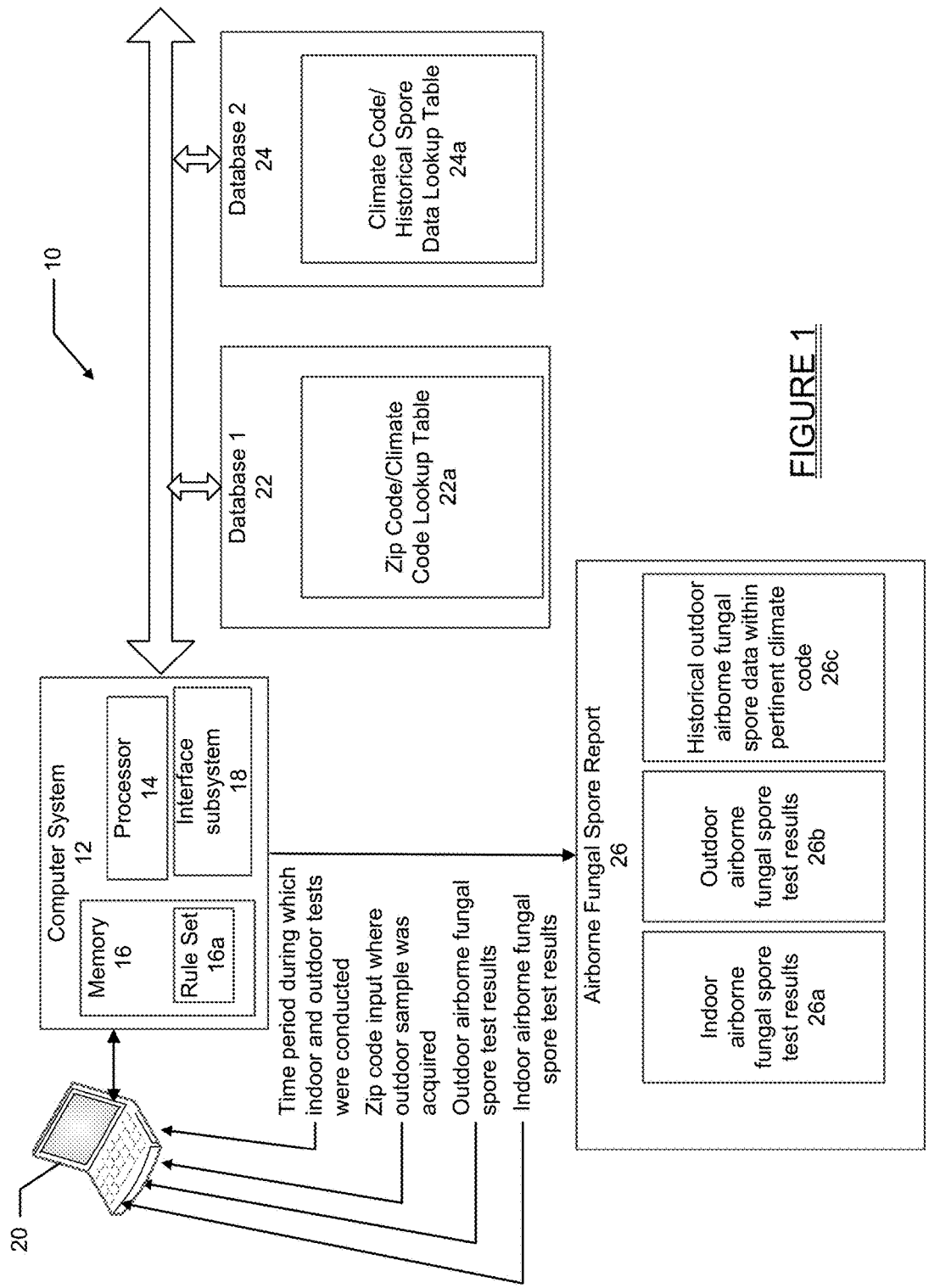
FIG. 1 is a high level block diagram of one embodiment of a mold data searching, collecting and reporting system in accordance with the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, a mold data searching, collecting and reporting system 10 is shown in accordance with one example of an embodiment of the present disclosure. In this regard the term "mold" will be used to mean airborne fungal spores. The system 10 may include a computer system 12 having a processor 14, a memory 16 and an interface subsystem 18. The computer system 12 may be in communication with a user input device 20, for example and without limitation a desktop computer, a laptop computer, a computing tablet, or even a smartphone running a suitable application which enables it to communicate with the computer system 12. The memory may contain rules set 16a, the contents of which will be described in greater detail in the following paragraphs.

The computer system 12 may be in communication with one or more databases, in this example first and second databases 22 and 24, respectively. First database 22 may be constructed with a lookup table 22a that correlates various subregions of a given region with various climate characteristic related codes. The system 10 is not limited to use with only one specific type of climate classification code, and in fact is expected to be able to be used with little or no modification with virtually any type of climate classification code. In one example, however, the climate characteristic codes (hereinafter simply "climate codes") are well known Koppen-Geiger climate classification codes that classify the various climate regions present on the Earth according to eleven (11) distinct climate "codes" as follows:

| Koppen-Geiger Climate Codes | |
|---|---|
| Climate Code | Description |
| Bsh | Semi-arid, steppe (hot) |
| BSk | Semi-arid, steppe |
| BSkn | Semi-arid, steppe w/summer fog |
| BWh | Arid low latitude desert (hot) |
| BWk | Arid mid latitude desert |
| Csa | Mediterranean/hot summer |
| Csb | Mediterranean/cool summer |
| Csbn | Mediterranean/summer fog |
| Dsb | Cool continental/dry summer |
| Dsc | Cold winter/dry summer |
| H | Highland/Timberline |

In this example the "subregions" are delineated by zip codes, and the larger geographic "region" may be any designated geographic region, for example a single state, or group of states within the United States. The region could also possibly be formed by a predetermined territory spanning two or more countries having a contiguous land mass, or possibly even a predetermined coastal area, desert-like area, etc., spanning two or more states or two or more countries formed by a contiguous land mass. The subregions could also be delineated by other markers besides zip codes, for example latitude and longitude boundaries that define limited smaller subregions of a larger geographic region. Another option would be using telephone area codes to denote subregions, which may be necessary when defining a geographic subregion that spans two or more countries. For the purpose of discussion, it will be assumed that the subregions are designated by zip codes, and that the climate codes are Koppen-Geiger climate classification codes.

The use of Koppen-Geiger climate code classifications is especially helpful in creating a significantly larger outdoor sample size. The larger outdoor sample size can help to improve the confidence that any outdoor sample(s) obtained outside the home or building is/are an accurate representation of the outdoor airborne spore levels in that geographic subregion. This is because geographic subregions that have the same Koppen-Geiger climate code classification can be expected to generally have the similar types of outdoor airborne mold spores present in generally similar concentrations. The second database 24 may contain a lookup table 24a constructed with historical airborne mold spore data for each Koppen-Geiger climate classification code within the region. Such data may be delineated by specific spore types and detection levels for each Koppen-Geiger climate classification code, for each month of the calendar year, as well as for the previous 12 month period (and/or possibly for year-to-date), or possibly a previous 24 month period. Still further, the database 24 may include all of the historical mold spore data that has been collected in each climate code (i.e., not limited to just the previous 12 month or 24 month period). While two databases 22 and 24 are illustrated, it would be possible to include all of the historical spore data in a single database if desired. Still further, in some instances it may ease the processing complexity if more than two distinct databases are used to look up and collect the relevant spore data.

The computer system 12 may be configured with a suitable application (non-transitory, executable machine code) stored in the memory 16 that enables it to receive various information input by a user from the user input device 20. Such user input information may include, without limitation, a subregion code, which in this example is a zip code where the home or building is located and where the indoor and outdoor spore samples were acquired. Other information that may be input by a user may be a day or date range during which the indoor and outdoor spore samples were acquired, as well as results of the indoor and outdoor airborne fungal spore sample(s) acquired at the home or building. Both the indoor and outdoor samples may include specific levels of every one of the different spore types detected. As an alternative, if the user input device 20 is a computing device such as a desktop computer, a laptop, a tablet or a smartphone, then a suitable application could be stored in its memory instead of using the computer system 12 for this purpose.

In the system 10 shown in FIG. 1, once the zip code and other information is entered into the computer system 12, the processor 14 of the computer system accesses the database 22 and uses lookup table 22*a* to determine what Koppen-Geiger climate classification code is associated with the specific zip code that has been entered. Once that specific Koppen-Geiger climate classification code is obtained, then the processor 14 accesses lookup table 24*a* to obtain the historical mold spore data in all other subregions within the region that have the same Koppen-Geiger climate classification code from database 24. This information may then be presented as one portion 26*c* of an airborne fungal spore report 26 along with the information pertaining to the outdoor airborne spore sample 26*b* and the indoor airborne spore sample 26*a*. The historical outdoor airborne fungal spore data may be further broken down to indicate spore types and levels historically present for the month that the indoor and outdoor samples were acquired, as well as over a longer time period such as a full year. The historical airborne outdoor spore types and levels presented in portion 26*c* may also be broken down by each month of the calendar year or presented in any other fashion that may help the user assess the validity of the outdoor sample test results in portion 26*b*. Each spore type presented from the historical data may further be broken down by rules contained in the rule set 16*a* or elsewhere into various categories such as "Very Low", "Low", "Medium", "High" and "Very High", in accordance with preset percentile values. Such predetermined percentile values may be set as, in one example, "Low" being a 2.5 percentile value, "Medium" being a 50 percentile value and "High" being a 97.5 percentile value. A "Frequency of Occurrence %" may be provided that indicates a frequency with which a specific spore type is found during a specific time period (e.g., specific month), as well as for a longer time period (e.g., a full year).

A more detailed example of one report 26' is shown in FIG. 4 for an outdoor sample that was taken in January in the 94006 zip code. Report 26' does not show the indoor spore sample data 26*a* which is shown in the report 26 of FIG. 1, but rather just outdoor spore sample data 26*b'* and the historical airborne outdoor spore data 26*c'*. Thus, the report 26' shown in FIG. 4 is slightly different than the report 26 shown in FIG. 1. It is anticipated that some users may wish to have two separate report documents created, such as a first report that just shows the indoor spore sample data 26*a* and the outdoor spore sample data 26*b*, and then a second report, such as report 26' of FIG. 4, that shows just the outdoor spore sample data 26*b'* and the historical airborne outdoor spore data 26*c'*. However, the present disclosure is not limited to any one way of presenting the sample spore data and the historical airborne spore data, and it is anticipated that some users will prefer a single report that includes all of the sample and historical data in one report document, while others may prefer two (or possibly more) separate report documents.

Figure 2:
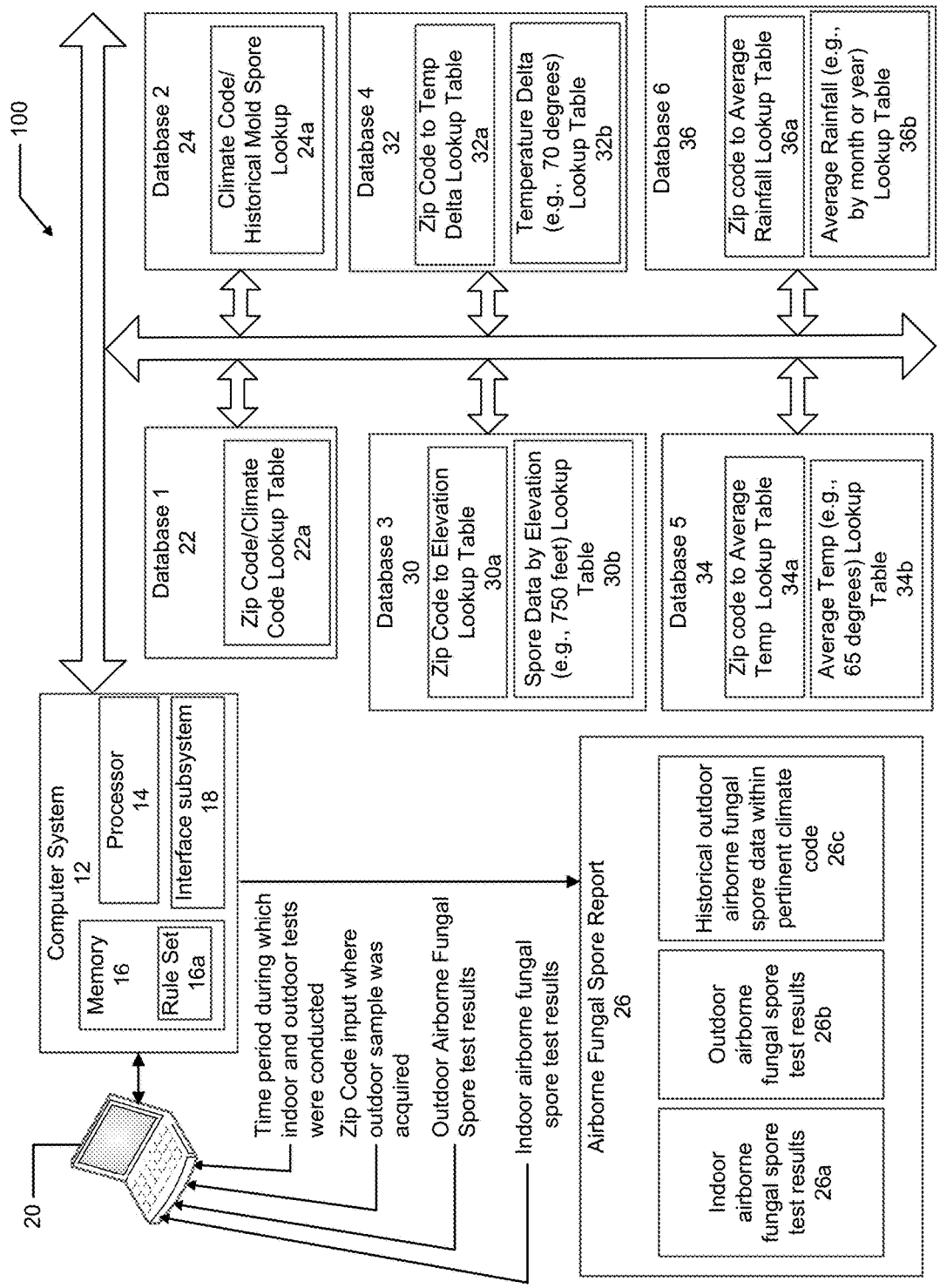
FIG. 2 is a high level block diagram of another embodiment of the present disclosure which also makes use of databases that hold historical spore data for different subregions based on elevation, temperature differential, average rainfall and average temperature.

FIG. 2 shows a system 100 which is a modification to the system 10 that includes additional databases to provide valuable additional historical outdoor airborne fungal spore data when the use of Koppen-Geiger climate classification codes is not deemed satisfactory. Components in common with those of the system 10 are denoted with the same reference numbers. Consider that some states only have two or three Koppen-Geiger climate classification code regions. As another example, the majority of the state of Florida is designated with only one Koppen-Geiger climate classification code. So inputting a specific zip code for a subregion of Florida will not be useful in helping to identify other subregions (e.g., areas defined by different zip codes) of Florida that are highly similar in climate characteristics to the zip code of interest. In states where the use of Koppen-Geiger climate classification codes is deemed inappropriate, then the system 100 may be used. The system 100 makes use of other geography/climate/weather factors that may have an influence on the mold spore types and counts in various subregions of the larger region (e.g., various zip codes of a given state), which can be highly useful in searching for and obtaining historical spore data for a mold collecting, reporting and analysis system. Such other factors may include, without limitation, elevation, average rainfall per year, temperature range between high and low temperatures during the year and average temperature over the year.

In the system 100 of FIG. 2 the additional databases 30, 32, 34 and 36 are used to provide corresponding lookup tables 30*a*/30*b*, 32*a*/32*b*, 34*a*/34*b* and 36*a*/36*b*, respectively, for historical outdoor airborne mold spore information from other subregions that may help in evaluating the obtained indoor and outdoor spore samples. In this example the lookup table 30*a* in database 30 includes information on whether the elevation associated with the zip code of interest is above or below a predetermined elevation threshold. This threshold may be based upon a statistical analysis of the elevation values present for the subregions in the given region. Certain subregions may be excluded from the table, or from receiving the final report, if their number of outside samples in the database falls below a certain limit (for example, they contain less than 20 samples).

In one example, the system 100 may actually calculate the mean of each variable for the subregions that are considered valid (i.e., subregions that contain a sufficient number of samples). The system 100 may then rank them as above or below the mean to determine the climate codes. If a subregion lacks the required number of samples, it is not included in the calculations. In that instance, it would not be assigned to a climate code and available for use with a "climate code" format style of report. Instead, the report would be based upon all of its state's data regardless of climate code).

Referring back to FIG. 2, in one example the elevation threshold is set at 750 feet. Database 30b provides historical spore data broken down according to whether the zip code is at/above 750 feet elevation, or below 750 feet elevation. However, any other elevation related metric(s) could be used. Thus, by accessing the database 30, historical spore data can be obtained for all other zip codes within a given region (e.g., within a state, or a group of states or some other designated larger region) that have the same elevation characteristic (i.e., either above 750 feet or below 750 feet) as the zip code of interest.

Lookup table 32a of database 32 may provide information on whether each zip code within the given region (e.g., a state or group of states) experiences an average monthly temperature differential across the months contained in the table of at least a certain amount, for example 5° F. Thus, any zip code having an average high temperature of 100° F. across the months included on the table and an average low temperature of 95° F. would be classified in one category (because of a temperature differential that equals or exceeds 5° F.), while a zip code that experiences an average high temperature of 98° F. and an average low temperature of 95° F. would be classified in a different category because the temperature differential (3° F. in this example) is below the predetermined 5° F. threshold. Lookup table 32b contains historical spore data for every zip code within the region based. From the above, it will be appreciated that rather than comparing only to yearly values, the report being generated more preferably makes use of the average value for a zip code across multiple years, and then assigns a climate code classification based upon these average values.

By accessing lookup table 32b, historical spore data can be obtained for each zip code in the region that has a temperature differential classification the same as the zip code of interest.

Lookup table 34a of database 34 may be used which classifies zip codes by whether the average annual high temperature over the years recorded on the table was above or below a predetermined threshold. For example, an average temperature threshold of a 65° F. may be used. Lookup table 34b provides the historical spore data for every zip code. Thus, using lookup table 34a enables the classification of the zip code of interest to be determined (i.e., above or below the threshold of 65° F.). Then using lookup table 34b enables the historical spore data for every zip code in the region to be obtained which has the same temperature classification as the zip code of interest.

Finally, lookup table 36a of the database 36 may include zip codes classified in accordance with some rainfall metric. For example, the zip codes of a given region may be classified by the average rainfall for a previous time period (e.g., month, year or longer). As one example, a value of 4.5 inches per month of rainfall may be selected as the predetermined threshold. Any zip code in the geographic region that has received an average monthly rainfall of less than 4.5 inches over the years contained in the table may be classified in one category, while any zip code that has an average monthly rainfall equal to or more than 4.5 inches over the years contained in the table may be classified in a different category. Accessing the lookup table 36a enables the computer system 12 to determine what classification the zip code of interest falls in (i.e., either above or below the 4.5 inch rainfall threshold). Then accessing lookup table 36b enables the historical spore data to be obtained for all of those zip codes in the region that have the same average rainfall classification as the zip code of interest.

The information from the databases 30-36 may be used to further supplement the historical spore data provided from the databases 22 and 24, or it may be used in place of the historical spore data provided by databases 22 and 24. In either event, separate categories can be presented in the spore report 26 to clearly breakdown the historical spore information by elevation, average rainfall, temperature and temperature differential (and further by any desired statistical metrics such as those described above). In this manner even if a region within which the outdoor spore sample was obtained is classified with a single Koppen-Geiger climate classification code, sufficient information from other subregions that have topography/climate characteristics similar to the subregion of interest can still be obtained to aid in the analysis of the outdoor spore sample. This can provide further valuable historical spore data that helps one to evaluate the outdoor spore and indoor spore samples.

It will also be appreciated that the above example of using elevation, temperature differential, average rainfall and average temperature thresholds is merely intended to show one example as to how different types of topography, weather and/or climate considerations can be used to help obtain additional information that may help in evaluating the outdoor spore sample. Virtually any other type of topographical, weather and/or climate related metric that has an influence on outdoor spore levels could be considered.

Furthermore, though the example above illustrates only the use of databases 30-36 to supplement the historical mold spore data, it will be appreciated that it would also be possible to include all of the information in databases 30-36 into a single database as well. Virtually any number of databases could potentially be used based upon the additional types of topography, weather and/or climate considerations being utilized. Also, it will be appreciated that different types of weather data, for example, dew point, relative humidity, frequency of snowfall or inches of snowfall per month or over a calendar year, frequency of fog per month or over a calendar year, overall cloudiness, etc., may potentially be used to classify various subregions of a larger region to aid in obtaining additional relevant airborne spore information.

Certain of the raw information, for example, rainfall within given areas of a region, may be available from Cloud-based historical weather data sources or weather stations, or possibly from other sources such as the National Oceanic and Atmospheric Administration ("NOAA"). In some applications it may be sufficient for the computer system 12 to obtain this information on a monthly or daily basis, but it is expected that monthly or less frequent updating of the databases 22-36 may be optimal. Certain information may be available for automated download while other information may need to be input manually into one or more of the databases 22-36 to periodically update the databases.

Various information such as elevation data or rainfall data may only be available for lookup from databases by latitude and longitude coordinates. For example, latitude and longitude coordinates may be correlated to zip codes via a public domain database. In this fashion, computer system 12 may access the public domain database to acquire the correct latitude and longitude coordinates for a given zip code of interest. Once the system 10 or 100 has obtained the pertinent latitude and longitude coordinates for the zip code of interest, the system 10 or 100 may then access the appropriate Lookup table(s) to obtain the topography, weather or climate information for those other subregions that are similar to the zip code of interest from the proper database.

For those situations where a subregion of interest that the outdoor spore sample was taken in happens to fall within two different Koppen-Geiger climate classification codes, or where the subregion of interest falls within both categories of a climate feature (e.g., part of the zip code has an elevation below 750 feet and part is above 750 feet), the rule set 16*a* stored in the memory 16 (or elsewhere) may include one or more specific rules on how the situation will be handled by the computer system 12. For example, the rule set 16*a* may include a rule that takes the median if a given zip code is served by more than two weather stations that are providing more than two sets of rainfall or temperature information. If a zip code is served by two weather stations then the average of the two data points may be taken. So for example, if two weather stations A and B exist and both serve a specific zip code, and the data from station A produces an average monthly rainfall of 4.2 inches, while the data from station B produces a monthly rainfall average of 4.6 inches, then the rule set may require the monthly rainfall average for that zip code to be interpreted as 4.4 inches.

If no weather station is available within a subregion, then another rule may be created that takes this situation into account. For example, a rule may be created that when no weather station data is provided for in a specific subregion, then weather station data may be substituted using the closest weather station within a specific mile radius (e.g., possibly 10 mile radius of the subregion). If no weather data is available from a weather station within a specific zip code for a given month, then an additional rule may be provided that allows the system 100 to substitute weather station data from the closest weather station within a predetermined mile radius, for that given month's data.

If a zip code falls within two different Koppen-Geiger climate classification codes, then a rule may be provided that indicates which climate code the subregion should be placed into. This rule is likely to be dependent upon the climate of the subregion of interest as well as its surrounding subregions. But as one example, such a rule may involve grouping a zip code with areas of high elevation into a high elevation subregion, when the situation arises that a region that does not include many areas of high elevation. Furthermore, it may be advantageous to provide different weights to certain ones of the metrics, especially in the event that historical spore information is not available for one of the metrics.

In the event that a given subregion of interest is within a region that has less than a predetermined minimum number of Koppen-Geiger climate classification codes (e.g., only one Koppen-Geiger climate classification code), but is otherwise bordered by one or more other distinct regions (e.g., states) that would be known to have subregions having similar climate characteristics, then system 10 could be modified to take advantage of historical spore data in the zip code(s) from one or more other states, or possibly just portions of such other states, or possibly just portions of other states that fall within a predetermined radius of the subregion (or zip code) of interest. Such a condition may exist in various areas of the United States where a zip code in one state is located in a pan handle area of the state (e.g., Oklahoma or Florida), but is bordered by one or more other states that contain zip codes that fall within the same Koppen-Geiger climate classification code. Or the system 10 may be configured such that in this instance (i.e., insufficient number of Koppen-Geiger climate classification code designated subregions in the state), the system 10 looks for zip codes within a predetermined radius (e.g., 250 miles) of the zip code of interest that have the same Koppen-Geiger climate classification code as the zip code of interest, and then obtains the historical spore data from each of those zip codes. Also, the system may be designed to contain larger regions of similar climate (e.g., multiple states) to utilize if a smaller region (e.g., a single state) lacks the necessary data.

Referring now to FIGS. 3A and 3B, a flowchart 200 is shown which illustrates one example of how various operations may be performed by the computer system 12 in receiving the indoor and outdoor spore sample data and obtaining the historical spore data from the available databases. For this example the system 100 of FIG. 2 will be referenced so that the operations of using either Koppen-Geiger climate classification codes or the topography/climate features described above can both be explained.

At operation 202 the zip code of interest is input to the computer system 12 via the terminal 20 along with the indoor and outdoor spore sample results. At operation 204 the processor 14 may use another lookup table (not shown) to determine what state the zip code of interest is in. At operation 206 the processor 14 may use an appropriate file stored in the memory 16, or alternatively still another database, to determine if the state that the zip code of interest is located in has at least the predetermined minimum amount of historical outdoor data to utilize a small regional table (e.g., such as similar climate codes within a given state). If a minimum number of outdoor spore samples is not available with the state or subregion, then a check is made at operation 207 to determine if a larger predetermined region (e.g., similar climate codes falling within a group of states falling within a predetermined radius of the zip code of interest) can provide sufficient historical climate data to meet the minimum requirement. If the check at operation 207 also provides a "No" answer, then at operation 209 a default condition arises in which climate data from a designated subregion or region is used without regard for the Koppen-Geiger climate classification codes (e.g., use all data within the state regardless of climate classification code). If the checks at either of operations 206 or 207 produce a "Yes" answer, meaning that the state has subregions including at least the predetermined minimum number of Koppen-Geiger climate classification codes and a sufficient amount of stored historical outdoor mold spore data, or the larger designated region does, then at operation 208 the processor 14 obtains the Koppen-Geiger climate classification code for the zip code of interest by accessing the lookup table 22*a* of database 22. If the subregion or zip code of interest has two or more Koppen-Geiger classification codes associated with it, then any rules from the rule set 16*a* (FIG. 1) may be obtained to address the situation, as indicated at operation 210. At operation 212, the processor 14 determines all other relevant zip codes in the state or subregion with the same Koppen-Geiger classification code, and uses the obtained rule(s) from operation 210 if needed, to help determine the relevant zip codes. At operation 214 the processor 14, then using the relevant zip codes associated with the Koppen-Geiger climate classification code obtained at operation 212, and the lookup table 24*a*, obtains the historical spore data for all of the other relevant zip codes that are classified with the same Koppen-Geiger climate classification code.

It will be appreciated that to create the information in the lookup table 22*a*, the subregions for the entire region (e.g., the entire state or group of states) may be superimposed over a Koppen-Geiger climate classification code map. In this manner each zip code of the entire region may be correlated with at least one Koppen-Geiger climate classification code. And as noted above, in some instances two or more Koppen-Geiger climate codes may potentially be correlated with a single zip code.

To update the data in Lookup table 24a, a batch processing operation may be run periodically, for example, once at the beginning of each month. The batch processing operation may be performed by the computer system 12 or by a different processing system. This may involve reading samples' spore types and counts for every outdoor airborne spore sample contained in database 24, sorting the data via Koppen-Geiger climate classification code based upon zip code, and calculating the frequency that the spores are found in certain set percentages (for example, those defined on the report as "Very Low", "Low", "Medium", "High", and "Very High") then storing the information along with an identification and the count of the number of samples included in that batch in database 24 if a sufficient minimum number of data points (e.g. 20) exist. By the nature of this query, only those outdoor airborne spore samples that were acquired in zip codes contained in the database 22a are used. This data may be collated across the entire data set, across all the Koppen-Geiger climate classification codes for the entire year, and across all Koppen-Geiger climate codes for each month of the calendar year. In this manner the lookup table 24a will contain an updated data set containing each spore type, their overall frequency, and the frequency that the given spore is found in certain set percentages, broken down by each Koppen-Geiger climate classification code of the region (e.g., the state), and further broken down by month. So by knowing a specific state (via zip code) and Koppen-Geiger climate classification code, the processor 14 can use the lookup table 24a of database 24 to obtain all the relevant historical outdoor spore data collected for every subregion having the same Koppen-Geiger climate classification code, for a user selected time period (e.g., previous month, year or otherwise). The existing statistical breakdown of the data can then be added from the lookup table 24a to the report 26c by the computer system 12 once the relevant data is retrieved. Essentially the same methodology may be employed with other topography/climate/weather codes to obtain the necessary data from the database 24 if such codes are being used in place of Koppen-Geiger climate classification codes. At operation 222 any pertinent rules from the rule set 16a that need to be applied may then be applied by the processor 14. At operation 224 a statistical analysis may then be made by the processor 14 on the historical spore data to break it down according to predetermined percentile ranges and percentages as discussed previously herein in connection with the spore report 26, and the example report shown in FIG. 4. The formal spore report 26 may then be generated at operation 226.

If the inquiries at either of operations 206 or 207 indicate that the zip code of interest falls within a state, subregion or region that has less than the predetermined minimum number of different Koppen-Geiger climate classification codes having less than a minimum amount of historical climate data, then the processor 14 may instead access the lookup tables associated with databases 30-36 at operations 216-222 to obtain the historical mold data within the region. At operation 224, any rules that may need to be applied may be obtained by the processor 14 from the rule set 16a and applied to the collected data to further augment/modify the collected data. The statistical analysis may then be performed by the processor 14 as noted at operation 226, and the report generated at operation 228. It will be appreciated that the flowchart 200 of FIGS. 3A and 3B represents just one example of a sequence of operations that may be employed, and a wide range of variations to the above operations may be implemented to meet the needs of a specific situation.

Figure 3A:
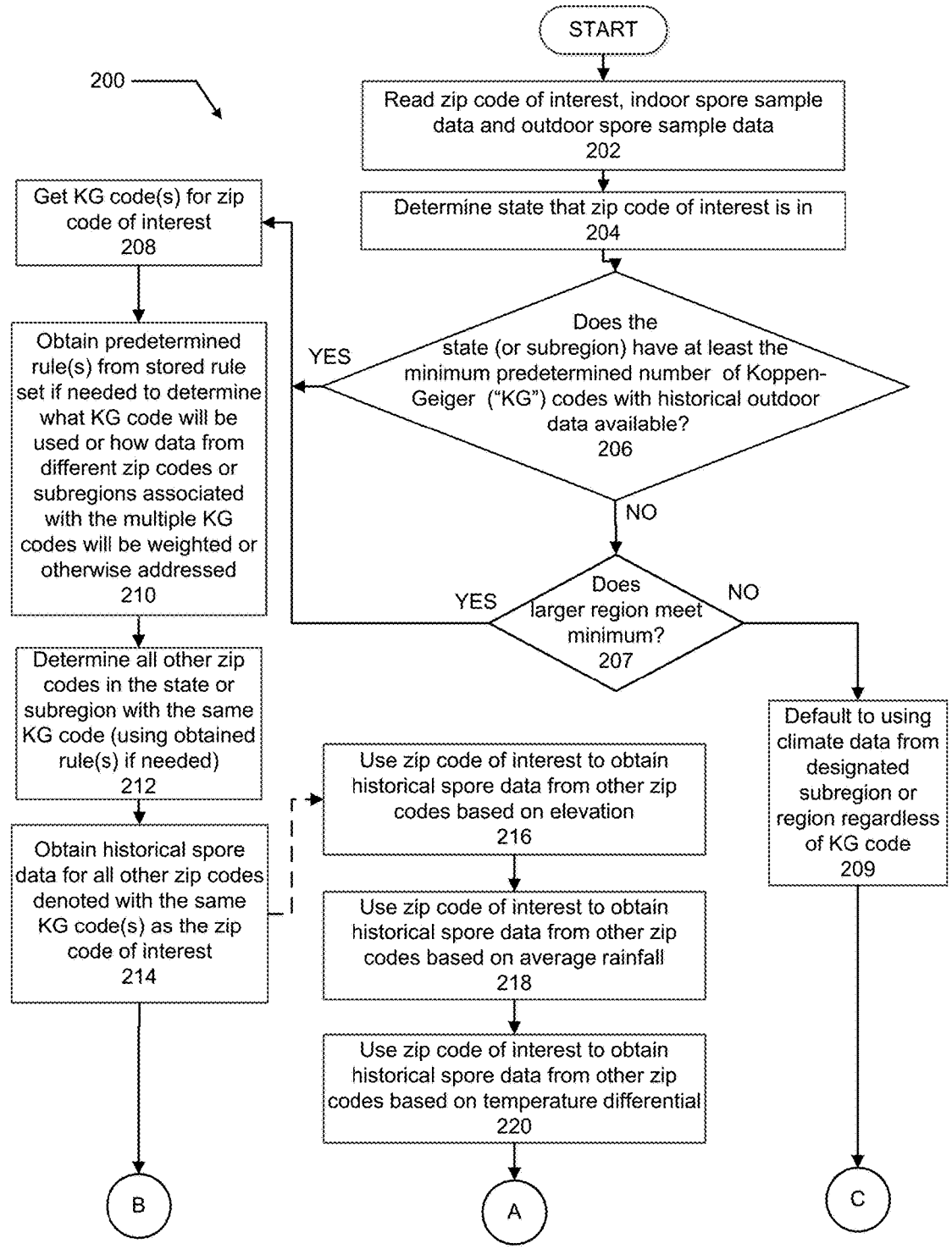
FIGS. 3A and 3B illustrate a flowchart showing one example of various operations that the system may perform in searching and collecting indoor and outdoor spore sample data and the historical spore data from other zip codes.
Figure 3B:
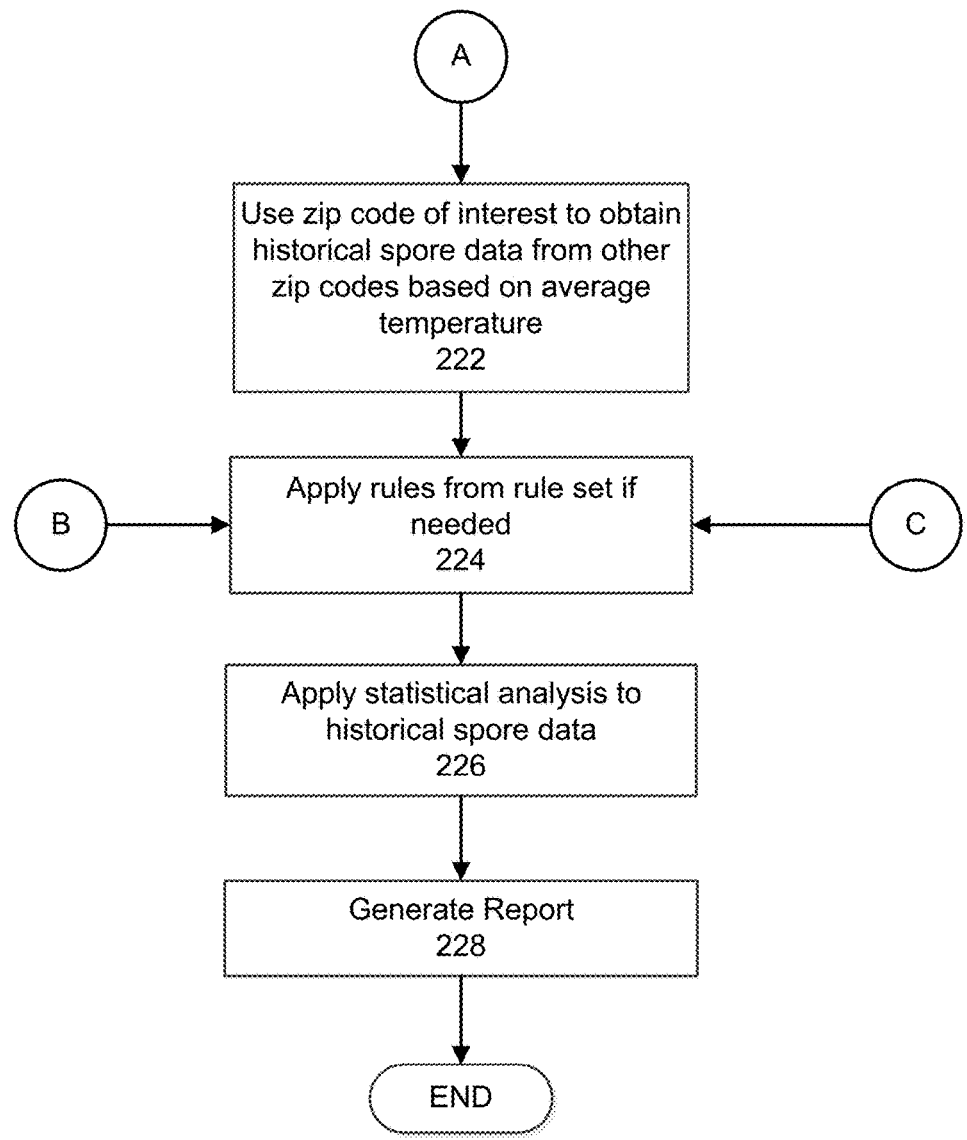

It will also be appreciated that in the example of operation set forth in FIGS. 3A and 3B, the system 10 initially is applying a hierarchical approach to first determining if a sufficient number of Koppen-Geiger climate classification codes, containing a predetermined minimum amount of historical mold spore data, is available within a first predetermined region in which the target zip code falls. If that condition is not met, then the system 10 determines if the sufficient minimum number of Koppen-Geiger climate classification codes and the minimum amount of historical mold spore data is available within a larger region (e.g., collection of states or entire country). If the required minimum number of Koppen-Geiger climate classification codes and minimum amount of historical mold spore data is still not available from the larger region, then historical data without regard to Koppen-Geiger climate classification codes may be obtained, or other metrics (e.g., average rainfall, temperature delta, etc.) may be used to provide the needed historical mold spore data.

In another hierarchical operational scheme, instead of initially checking the number of Koppen/climactic codes available for a zip code or subregion, the system 10 may check a specific zip code against a list in another lookup table that tells it what format report to use for that zip code. For example, if the zip code is a California zip code, the system 10 may then know, from checking the appropriate lookup table, to use the Koppen code style of report where historical data is pulled from other zip codes or regions having the same Koppen-Geiger climate code classification. If the zip code is not a California zip code, then the system 10 may know that it is to use a climactic code report at either the state or group of states level (i.e., data pulled from all zip codes within the state, or data pulled from a group of states). So in this example, when the system 10 determines that obtaining historical data based on a similar Koppen-Geiger climate classification code is not to being done, then the system 10 collects historical mold spore data simply from one state or a group of states, based on the minimum number of outdoor samples that are available in either instance. The number of climate classifications isn't a limitation, because the report logic will actually sub-divide the samples into several codes based on their average values regardless of how many are available. A lower numerical limit of samples may be set in order to ensure that each climate classification would have enough samples to be meaningful. Still further, the system 10 could be configured to determine what style of report is to be generated based on the number of Koppen codes in the state of interest. The look up table may also list zip codes which do not contain enough outdoor samples to be subdivided by climactic code, and indicate that these should be reported with statistics for their entire state and not a given climactic code.

The system and method of the present disclosure provides a valuable tool for intelligently determining what other subregions of a given area include historical airborne mold spore data that would be useful in evaluating an outdoor spore sample taken at a given location. The system and method can significantly sharpen the overall precision of a mold analysis system and/or operation by even further improving the integrity and/or understanding of the outdoor spore sample data by using historical spore sample data from other subregions that have similar or identical topographical, weather and/or climate features. This can help to eliminate the undertaking of costly remediation procedures inside a home or dwelling by helping to verify or clarify outdoor spore data, which can then be used in more accurately interpreting and understanding the indoor spore sample data.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for analyzing historical mold spore data comprising:
   a computer having a processor and an interface subsystem;
   at least one database containing information correlating subregion codes of a predetermined geographic area with ones of predetermined climate classification codes associated with each of the subregion codes, the database further including available historical mold spore data, correlated to each said predetermined climate classification code, for each one of the subregion codes;
   the interface subsystem for electrically communicating with the at least one database;
   a personal electronic device associated with a user of the system and configured to remotely access the computer and to communicate with the computer;
   the predetermined climate classification codes including Koppen-Geiger climate classification codes;
   the computer configured to:
      receive an input indicating a target subregion code, wherein the target subregion code identifies an area falling within the predetermined geographic area;
      identify a specific one of the predetermined climate classification codes that is associated with the target subregion code;
      analyze subregion codes obtained from the database against geographical boundary information to identify what other ones of the subregion codes correlate to subregions, besides the target subregion code, which fall within the predetermined geographic area;
      analyze the identified other subregion codes to determine a climate classification code associated with each other one of the subregion codes;
      analyze the climate classification codes for each one of the identified other subregion codes within the predetermined geographic area, to determine which ones have climate classification codes which match the specific climate classification code associated with the target subregion code;
      obtain portions of the stored historical mold spore data which is, or are, associated with the ones of the subregion codes falling within the predetermined geographic area, but which are assigned the same climate classification code, or climate classification codes, as the specific one of the predetermined climate classification codes;
      using the obtained portions of the historical mold spore data to generate a report that further supplements an analysis of mold spore activity in the target subregion; and
      using the computer to electrically transmit the report to the user's personal electronic device.

2. The system of claim 1, wherein the subregion codes comprise zip codes.

3. The system of claim 1, wherein the predetermined climate classification codes comprise codes associated with different elevations within the predetermined geographic area.

4. The system of claim 3, wherein the different elevations are determined in accordance with a threshold elevation, such that each one of the subregion codes has associated therewith a code indicating whether each is above or below the threshold elevation.

5. The system of claim 1, wherein the predetermined climate classification codes comprise codes relating to different average annual high temperatures within the predetermined geographic area.

6. The system of claim 1, wherein the predetermined climate classification codes comprise codes relating to different temperature differentials within the predetermined geographic area.

7. The system of claim 1, wherein the predetermined climate classification codes comprise codes relating to average rainfall within the predetermined geographic area.

8. The system of claim 1, further comprising a rule set accessible by the processor for determining at least one rule to be applied in the event the target subregion code has associated therewith two different ones of the climate classification codes.

9. The system of claim 1, wherein the database comprises:
   a first database for containing information correlating subregion codes to specific ones of the climate classification codes; and
   a second database containing the historical mold spore data correlated to each of the subregion codes within the predetermined geographic area.

10. The system of claim 1, wherein the processor implements a hierarchical test to:
    make a first determination if at least a predetermined number of different ones of the climate classification codes containing a predetermined sufficient minimum amount of historical mold spore data is present within the predetermined geographic area; and
    if the first determination indicates that the predetermined number of different ones of the climate classification codes containing the predetermined sufficient minimum amount of historical mold spore data is not present, then making a second determination to determine if a larger predetermined geographic area, within which the target subregion code is present, has at least the predetermined number of different ones of the climate classification codes with the minimum amount of historical mold spore data.

11. A system for analyzing mold spore data and generating mold spore data reports comprising:
    a computer configured to communicate with a personal electronic device which is accessing the system;
    at least one database in communication with the computer which contains information correlating subregion codes of a predetermined geographic area with ones of predetermined climate classification codes associated with each of the subregion codes, the database further including available historical mold spore data, correlated to each said predetermined climate classification code, for the subregion codes;
    the computer configured to:
       receive an input from the personal electronic device indicating a target subregion code, wherein the target subregion code identifies an area falling within the predetermined geographic area;

identify a specific one of the predetermined climate classification codes that is associated with the target subregion code;

analyze stored information using the database and stored geographical boundary information, to identify specific other ones of the subregion codes corresponding to those other subregions which are geographically located within the predetermined geographic area, but which differ from the target subregion code;

analyze the identified other ones of the subregion codes to determine a climate classification code associated with each;

analyze the climate classification codes for each one of the other subregion codes to identify which ones match the climate classification code the climate classification code of the target subregion code;

use a stored rule set to analyze and determine if a sufficient number of the other subregion codes, which match the target subregion code, are present within the predetermined geographic area which have at least a predetermined minimum quantity of the historical mold spore data available for use, and when the determination indicates that an insufficient number of the other subregion codes are available, then using at least one of elevation or weather data to supplement the historical mold spore data;

obtain portions of stored historical mold spore data from the database which is associated with ones of the subregion codes falling within the predetermined geographic area that have the specific one of the predetermined climate classification codes associated therewith;

using the obtained portions of the historical mold spore data to generate a report that further supplements an analysis of mold spore activity in the target subregion; and using the computer to electrically transmit the report to the personal electronic device.

12. The system of claim 11, wherein the subregion codes comprise zip codes.

13. The system of claim 11, wherein the climate classification codes comprise Koppen-Geiger climate classification codes.

14. The system of claim 11, wherein the at least one database comprises:
a first database for containing information correlating ones of the subregion codes to specific ones of the climate classification codes; and
a second database containing the historical mold spore data correlated to each of the subregion codes within the predetermined geographic area.

15. The system of claim 11, wherein the climate classification codes are associated with at least one of:
different elevations within the predetermined geographic area;
different average temperatures within the predetermined geographic area;
different temperature differentials within the predetermined geographic area; and
different average rainfall levels within the predetermined geographic area.

16. A method for analyzing mold spore data, the method comprising:
providing at least one database containing information correlating subregion codes of a predetermined geographic area with ones of predetermined climate classification codes associated with each of the subregion codes, the database further including available, stored, historical mold spore data, correlated to each said predetermined climate classification code, for the subregion codes;
receiving an input indicating a target subregion code, wherein the target subregion code identifies an area falling within the predetermined geographic area;
using an electronic component to identify a specific one of the predetermined climate classification codes that is associated with the target subregion code;
analyzing stored information from the database and geographical boundary information to identify what other subregion codes define subregions which are located within the predetermined geographic area;
analyzing the identified other subregion codes to determine a climate classification code associated with each;
analyzing, through a comparison operation, the climate classification codes for each one of the other subregion codes, to identify which ones of the other subregion codes have a climate classification code which matches the climate classification code associated with the target subregion code;
using the electronic component to obtain portions of the stored historical mold spore data from the database which is associated with ones of the subregion codes falling within the predetermined geographic area that have the specific one of the predetermined climate classification codes associated therewith, but which are assigned the same climate classification code, or climate classification codes, as the target subregion code; and
using the obtained portions of the historical mold spore data to generate a report that further supplements an analysis of mold spore activity in the target subregion; and
using the computer to electrically transmit the report to a user's personal electronic device.

17. The method of claim 16, wherein at least one of:
the climate classification codes comprise Koppen-Geiger climate classification codes; or
the subregion codes comprise zip codes.

* * * * *